United States Patent
Yuyama

(10) Patent No.: US 8,817,171 B2
(45) Date of Patent: Aug. 26, 2014

(54) IMAGING APPARATUS WITH AUTOMATIC EXPOSURE ADJUSTING FUNCTION

(75) Inventor: Masami Yuyama, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 1212 days.

(21) Appl. No.: 11/901,208

(22) Filed: Sep. 14, 2007

(65) Prior Publication Data

US 2008/0068491 A1    Mar. 20, 2008

(30) Foreign Application Priority Data

Sep. 14, 2006 (JP) .................................. 2006-249343

(51) Int. Cl.
H04N 5/235 (2006.01)
H04N 5/222 (2006.01)

(52) U.S. Cl.
USPC .......................................... 348/362; 348/371

(58) Field of Classification Search
USPC ........................................ 348/362, 224.1, 371
See application file for complete search history.

(56) References Cited

U.S. PATENT DOCUMENTS

| 5,568,194 | A * | 10/1996 | Abe | 348/223.1 |
|---|---|---|---|---|
| 7,092,563 | B2 * | 8/2006 | Shiratani | 382/154 |
| 7,457,477 | B2 * | 11/2008 | Petschnigg et al. | 382/274 |
| 7,565,073 | B2 * | 7/2009 | Kameyama et al. | 396/123 |
| 7,602,969 | B2 * | 10/2009 | Yamada et al. | 382/167 |
| 7,652,717 | B2 * | 1/2010 | Enge et al. | 348/371 |
| 7,683,964 | B2 * | 3/2010 | Okuno | 348/364 |
| 7,834,931 | B2 * | 11/2010 | Tanaka et al. | 348/371 |
| 2003/0030730 | A1 * | 2/2003 | Nakayama | 348/223.1 |
| 2004/0238718 | A1 * | 12/2004 | Washisu | 250/201.2 |
| 2004/0252225 | A1 * | 12/2004 | Ojima et al. | 348/362 |
| 2005/0195290 | A1 * | 9/2005 | Takeshita | 348/223.1 |
| 2005/0195319 | A1 * | 9/2005 | Poplin | 348/371 |
| 2006/0216012 | A1 * | 9/2006 | Kuo et al. | 396/106 |
| 2007/0047945 | A1 * | 3/2007 | Nose et al. | 396/157 |
| 2007/0165960 | A1 * | 7/2007 | Yamada | 382/254 |

FOREIGN PATENT DOCUMENTS

| JP | 5-19325 | A | 1/1993 |
|---|---|---|---|
| JP | 8-328069 | A | 12/1996 |
| JP | 2002-90872 | A | 3/2002 |
| JP | 2003-066504 | A | 3/2003 |
| JP | 2003-179808 | A | 6/2003 |

OTHER PUBLICATIONS

Japanese Office Action dated Jul. 5, 2011 (and English translation thereof) in counterpart Japanese Application No. 2006-249343.

* cited by examiner

*Primary Examiner* — Aung S Moe
*Assistant Examiner* — Amy Hsu
(74) *Attorney, Agent, or Firm* — Holtz Holtz Goodman & Chick PC

(57) ABSTRACT

In an imaging apparatus having LED 1*j* for emitting light toward an object, an imaging unit 1 having CCD 1*d* generates a first object image with LED 1*j* emitting light and a second object image with LED 1*j* emitting no light. Average brightness of the first object image and average brightness of the second object image are calculated. Brightness difference between the average brightness of the first object image and the average brightness of the second object image is calculated. Brightness difference of the object is obtained using the calculated brightness difference between the first and second object images, and under control of CPU 9, a process is executed for adjusting exposure conditions based on the brightness difference of the object.

15 Claims, 4 Drawing Sheets

100

IMAGING APPARATUS WITH AUTOMATIC EXPOSURE ADJUSTING FUNCTION

BACKGROUND OF THE INVENTION

1. Field of the Invention

The present invention relates to an imaging apparatus and an exposure controlling method, which are used in a digital camera with an automatic exposure adjusting function.

2. Description of the Related Art

Today, digital cameras with an automatic exposure adjusting function are widely used. In these digital cameras, exposure conditions are adjusted based on brightness of an object image obtained on assumption that a reflectance ratio of the object in the natural conditions is 18%.

But these digital cameras have drawbacks that when a blackish object whose reflectance ratio is lower than 18% or a whitish object whose reflectance ratio is higher than 18% is photographed, the exposure conditions are set to over exposure conditions or under exposure conditions compared with the appropriate exposure conditions, and as a result an appropriately exposed picture cannot be obtained.

A camera was proposed, which is capable of adjusting the exposure conditions based on the reflectance ratio of the object (Refer to Japanese Patent Application Hei8-328069 A). The camera has a built-in flash unit, and measures the reflectance ratio of the object and adjusts light volume produced by the flash unit based on the measured reflectance ratio, thereby obtaining an appropriately exposed picture of the object even though the reflectance ratio of the object is extremely high or low.

But the camera disclosed in above Japanese Patent Application Hei8-328069 A calculates the reflectance ratio of the object based on the light volume of light produced by the flash unit and the light volume of light received by a light receiving device. Therefore, all the light produced by the flash unit must be applied to the object, and the reflectance ratio of the object can be calculated correctly only in the state where all the light produced by the flash unit can be applied to the object.

The camera involves a problem that the flash unit cannot emit light under the appropriate exposure conditions in the state other than the state where all the light produced by the flash unit is applied to the object. As a result, appropriate exposed pictures cannot be obtained with the above described camera.

The present invention has been made to solve the problems involved in the conventional technique, and has an object to provide an imaging apparatus and an exposure controlling method, which are capable of setting appropriate exposure conditions based on the reflectance ratio of the object.

SUMMARY OF THE INVENTION

According to one aspect of the present invention, there is provided an imaging apparatus which comprises a flash unit for emitting light toward an object, an imaging unit for photographing the object to generate image information including an object image of the object, wherein the imaging unit generates first image information including a first object image of the object with the flash unit emitting light, and generates second image information including a second object image of the object with the flash unit emitting no light, a brightness obtaining unit for obtaining brightness of the first object image based on the first image information generated by the imaging unit and for obtaining brightness of the second object image based on the second image information generated by the imaging unit, a brightness-difference obtaining unit for obtaining brightness difference between the brightness of the first object image obtained by the brightness obtaining unit and the brightness of the second object image obtained by the brightness obtaining unit, thereby obtaining brightness difference of the object relating to the obtained brightness difference, and an exposure-condition adjusting unit for adjusting exposure conditions under which the imaging unit photographs the object, based on the brightness difference of the object obtained by the brightness-difference obtaining unit.

According to other aspect of the present invention, there is provided an exposure controlling method in an imaging apparatus having a flash unit for emitting light toward an object, an imaging unit for photographing the object to generate image information including an object image of the object, and a brightness obtaining unit for obtaining brightness of the object image based on the image information generated by the imaging unit, the method comprising photographing the object with the flash unit emitting light, thereby generating first image information including a first object image of the object, photographing the object with the flash unit emitting no light, thereby generating second image information including a second object image of the object, obtaining brightness of the first object image based on the first image information and brightness of the second object image based on the second image information, obtaining brightness difference between the brightness of the first object image and the brightness of the second object, thereby obtaining brightness difference of the object relating to the obtained brightness difference, and adjusting exposure conditions under which the imaging unit photographs the object, based on the obtained brightness difference of the object.

According to another aspect of the present invention, there is provided a computer program product stored on a computer readable medium for controlling operation of a computer, the computer readable medium mounted on an imaging apparatus which has the computer, a flash unit for emitting light toward an object, an imaging unit for photographing the object to generate image information including an object image of the object, and a brightness obtaining unit for obtaining brightness of the object image based on the image information generated by the imaging unit, the computer program product making the computer perform functions including function of photographing the object with the flash unit emitting light, thereby generating first image information including a first object image of the object, function of photographing the object with the flash unit emitting no light, thereby generating second image information including a second object image of the object, function of obtaining brightness of the first object image based on the first image information and brightness of the second object image based on the second image information, function of obtaining brightness difference between the brightness of the first object image and the brightness of the second object image, thereby obtaining brightness difference of the object relating to the obtained brightness difference, and function of adjusting exposure conditions under which the imaging unit photographs the object, based on the obtained brightness difference of the object.

DETAILED DESCRIPTION OF THE PREFERRED EMBODIMENTS

Figure 1:
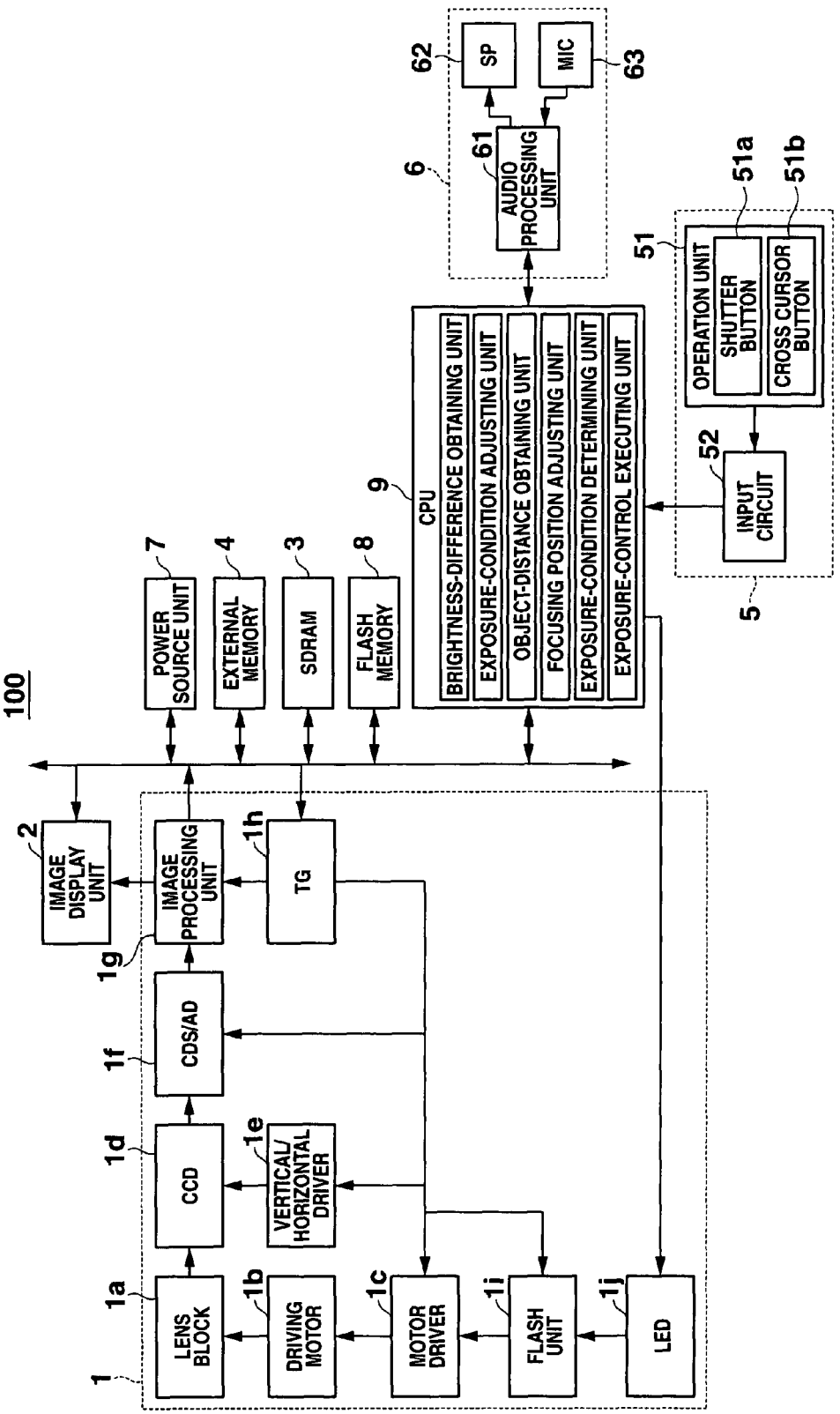
FIG. 1 is a block diagram schematically illustrating an embodiment of a digital camera, and more specifically a configuration of the digital camera utilizing the present invention.

Now, specific embodiments of the present invention will be described in detail with reference to the accompanying drawings. The scope of the present invention is by no means restricted to examples illustrated in the drawings.

FIG. 1 is a view schematically showing a configuration of an embodiment of a digital camera 100 utilizing the present invention.

The digital camera (imaging apparatus) 100 of the embodiment performs an automatic exposure process to adjust exposure conditions under which an object is photographed, based on brightness difference of the object relating to brightness difference of an object image between brightness of an object image photographed with LED 1j emitting light and brightness of an object image photographed with LED 1j emitting no light.

More specifically, the digital camera 100 comprises an imaging unit 1, image display unit 2, SDRAM 3, external memory 4, input operation unit 5, audio input/output unit 6, power source unit 7, flash memory 8, and CPU 9, as shown in FIG. 1.

The imaging unit 1 serves; for example, to convert an optical image of the object into an electric signal to obtain image data. The imaging unit 1 comprises a lens block 1a, driving motor 1b, motor driver 1c, CCD (Charge Coupled Device) 1d, vertical/horizontal driver 1e, CDS/AD circuit 1f, image processing unit 1g, timing generator (TG) 1h, flash unit (strobe light) 1i, and LED 1j.

The lens block 1a has a zoom lens, focus lens, and aperture mechanism (not shown). The motor driver 1c drives the driving motor 1b in accordance with a timing signal sent from the timing generator 1h, to move the zoom lens and focus lens along an optical axis thereof to focus on the object, and to adjust an aperture to ensure appropriate exposure.

An optical image of the object passes through the lenses and aperture mechanism to be focused on CCD 1d.

CCD 1d is a device which accumulates electric charges in proportion to an amount of incident light reaching thereon. The electric charges accumulated on CCD 1d are read successively in response to a driving pulse signal sent from the vertical/horizontal driver 1e. The vertical/horizontal driver 1e operates in accordance with the timing signal sent from the timing generator 1h to generate the driving pulse signal. An analog signal read from CCD 1d is supplied to CDS/AD circuit 1f.

CDS/AD circuit 1f executes various processes on the received analog signal, such as a color separating process, gain adjusting process, and white balancing process, and outputs digital image data to the image processing unit 1g.

The image processing unit 1g separates the received image data into a brightness signal and a color-difference signal in accordance with a control signal sent from CPU 9.

In other words, the image processing unit 1g works as a brightness obtaining unit for obtaining brightness of the object image relating to the image data, based on the digital image data output from CDS/AD circuit 1f. More specifically, the image processing unit 1g calculates (obtains) brightness of a photometry area defined in the object image (a portion of the object image) based on the image data of the object photographed with LED 1j emitting light and the image data of the object photographed with LED 1j emitting no light. The photometry area defined in the object image is used in the automatic exposure process.

The image data is output from the image processing unit 1g and temporarily stored on SDRAM 3. Further, the image data is supplied to the image display unit 2 to be displayed thereon.

When taking a picture of an object, the flash unit 1i is controlled in accordance with a predetermined operation of an operation unit 51 by a user or a control operation of CPU 9, and emits light towards the object in response to the timing signal sent from the timing generator 1h.

In the automatic exposure process (AE), LED 1j emits light at a predetermined timing to illuminate the object. More specifically, in the automatic exposure process (AE), LED 1j emits approximately equivalent amount of light both in a reference brightness-difference obtaining process (to be described later) and in a brightness-difference obtaining process (to be described later).

LED 1j serves as a light emitting unit for emitting light toward an object, thereby illuminating the same.

The image display unit 2 consists of a display screen such as LCD (Liquid Crystal Display) and a back light. The image display unit 2 is controlled in accordance with a display signal sent from CPU 9 to display on the display screen a through image and an image to be photographed by the imaging unit 1, and image data generated and stored in the external memory 4.

The external memory 4 comprises a recording medium which is detachably installed on a camera body. The external memory 4 stores image data generated by the imaging unit 1.

The input operation unit 5 comprises the operation unit 51 prepared for the user to operate the digital camera 100 and an input circuit 52 for inputting to CPU 9 operation signals sent from the operation unit 51.

The operation unit 51 has various operation buttons provided on various portions of the camera body of the digital camera 100. The operation buttons includes a shutter button 51a for instructing the imaging unit 1 to take a picture of an object, a cross cursor button 51b for selecting a photometry area(s) and/or a focus area(s), and the like.

The shutter button 51a is adapted to be pushed in two ways, that is, the button can be pushed halfway or full-way. The shutter button 51a outputs an operation signal corresponding to the halfway pushing operation or full way pushing operation.

With an object image displayed on the image display unit 2, the cross cursor button 51b is adapted to be operated by the user to specify the photometry area for calculating brightness of the object image. More specifically, the photometry area is displayed on a through image displayed on the image display unit 2 in an overlapping manner, and with the through image displayed on the image display unit 2, the user is allowed to move the photometry area to his or her desired area within a frame (not shown) of the displayed through image by operating the cross cursor button 51b, thereby setting the photometry area at such desired area by operating a decision button (not shown).

The cross cursor button 51b makes up an area for specifying the photometry area where brightness of the object image is calculated.

The display of the photometric area frame may be made disappeared from the display screen after the photometry area has been set.

The audio input/output unit 6 comprises an audio processing unit 61, speaker (SP) 62, and microphone (MIC) 63.

Receiving an instruction sent from CPU 9, the audio input/output unit 6 makes the audio processing unit 61 store sound data collected by the microphone 63 in the external memory 4 and also makes the audio processing unit 61 output from the speaker 62 operation sounds based on the sound data stored in the external memory 4.

The power source unit 7 comprises a battery (not shown) detachably mounted on the camera body, and supplies electric power to whole parts of the digital camera 100.

CPU 9 reads system program stored on the flash memory 8, and expands the same program on a work area in SDRAM 3, thereby controlling overall operation of the digital camera 100.

The flash memory 8 is a re-writable nonvolatile memory and is used to store various sorts of computer program and data.

Figure 2:
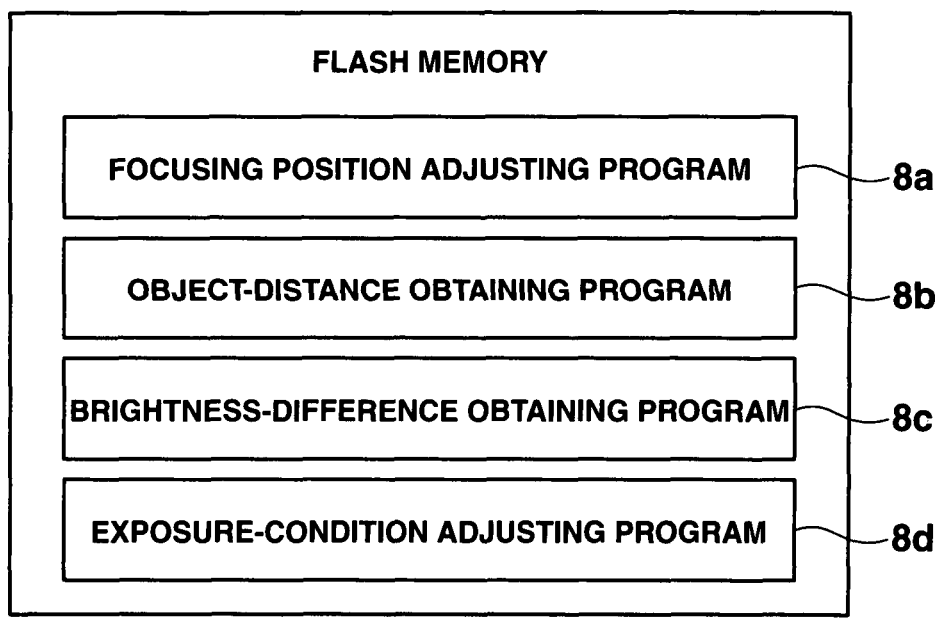
FIG. 2 is a view showing contents of a flash memory mounted on the digital camera of FIG. 1.

More specifically, for example, on the flash memory 8 are stored focusing-position adjustment program 8a, object-distance obtaining program 8b, brightness-difference obtaining program 8c, and exposure-condition adjusting program 8d, as shown in FIG. 2.

The focusing-position adjustment program 8a serves to make CPU 9 function as a focusing-position adjustment unit. That is, the focusing-position adjustment program 8a is computer program that makes CPU 9 function to execute an automatic focusing process to adjust (focusing adjustment) a focusing position of a focus area (distance measurement area) in an image photographed by the imaging unit 1. More specifically, when the user pushes the shutter button 51a halfway, CPU 9 runs the focusing-position adjustment program 8a to move the focus lens and the like along the optical axis, thereby adjusting the focusing position in a contrast AF system.

In the contrast AF system, image signals are read from CCD 1d successively, as focusing lenses such as the focus lens moves along the optical axis, and a lens position on the optical axis where an image of the highest contrast ratio is obtained within the focus area is set as the focusing position of the object, and then the focusing lens is adjusted to such lens position.

AF system other than the contrast AF system such as a phase-difference AF system may be employed in the automatic focusing process. In phase-difference AF system the object distance "L" can be calculated directly, and therefore this phase-difference AF system is more preferable than the contrast AF system.

The object-distance obtaining program 8b makes CPU 9 function as an object-distance obtaining unit. That is, the object-distance obtaining program 8b is computer program that makes CPU 9 function to execute an object-distance measuring process for calculating the object distance "L" when the user takes a picture with the imaging unit 1. More specifically, CPU 9 runs the object-distance obtaining program 8b to calculate the object distance "L" from the position of the focusing lens which has been adjusted on the optical axis in the automatic focusing process.

Meanwhile, to calculate the object distance "L", CPU 9 may run a predetermined calculation program or use a predetermined conversion table.

The brightness-difference obtaining program 8c makes CPU 9 function as a brightness-difference obtaining unit. That is, the brightness-difference obtaining program 8c is computer program that makes CPU 9 function to execute a brightness-difference obtaining process for calculating a brightness difference of an object image between brightness 1 of an object image 1 calculated by the image processing unit 1g and brightness 2 of an object image 2 calculated by the image processing unit 1g, where the object image 1 is generated with LED 1j emitting no light toward an object and the object image 2 is generated with LED 1j emitting light toward the object.

More specifically, CPU 9 runs the brightness-difference obtaining program 8c to calculate a brightness difference between average brightness of the photometry area in the object image 2 generated with LED 1j emitting light and average brightness of the photometry area in the object image 1 generated with LED 1j emitting no light. The photometry area is defined within the object image and is used in the automatic exposure process.

The exposure-condition adjusting program 8d makes CPU 9 function as an exposure-condition adjusting unit. That is, the exposure-condition adjusting program 8d is computer program that makes CPU 9 function to execute an exposure-condition adjusting process for adjusting exposure conditions based on the object brightness-difference "B", reference brightness-difference "A", and the object distance "L". The intensity of light is inversely proportional to the square of the distance from the light source. Therefore, when taking a picture, CPU 9 executes the brightness-difference obtaining process to obtain the object brightness-difference "B", and further executes an object-distance obtaining process (to be described later) to obtain an object distance "L" (m), and then converts the object brightness-difference "B" by multiplying the square of the object distance "L" in accordance with the following formula (1), thereby obtaining a solution "C". Further, CPU 9 calculates a target brightness "D" based on the solution "C" and the reference brightness-difference "A" calculated in a reference brightness-difference obtaining process (to be described later) in accordance with the following formula (2), where, for example, a predetermined target brightness is set to 120 on the assumption that the reflectance ratio of the object is 18%.

[Formula 1]

$$C = B \times L^2 \qquad (1)$$

[Formula 2]

$$D = 120 \times C/A \qquad (2)$$

Then, under control of CPU 9, the exposure conditions of the digital camera 100 are adjusted based on the target brightness "D".

The exposure conditions mean any of conditions that can adjust and/or change brightness of the object image produced by the digital camera 100. For instance, exposure conditions include the amount of light emitted from the flash unit 1i, aperture figure of the aperture mechanism of the lens block 1a, exposure time of CCD 1d (shutter speed), the number of pixels to be added in a pixel adding process for adding plural adjacent pixels within CCD 1d or in other element, and gain of CDS/AD circuit 1f.

The exposure-condition adjusting process includes an exposure-condition determining process for determining the exposure conditions and an exposure-control executing process for executing exposure control based on the determined exposure conditions.

The exposure-condition adjusting process is executed under control of CPU 9 in response to pushing operation of the shutter button by the user. More specifically, when the user pushes the shutter button 51a halfway, the exposure-condition determining process is executed, and when the user pushes the shutter button 51a full way, the exposure-control executing process is executed.

As described above, CPU 9 functions as an exposure-condition determining unit for determining the exposure conditions and also as an exposure-control executing unit for executing exposure control based on the determined exposure conditions.

The flash memory 8 serves as a reference brightness-difference storing unit for storing the reference brightness-difference.

The reference brightness-difference is calculated in the reference brightness-difference obtaining process, which is executed with respect to individual cameras, for example, at factory shipment.

The reference brightness-difference obtaining process is substantially similar to the brightness-difference obtaining process except that the process is executed in the case where an object is photographed, whose reflectance ratio is 18% and which locates at a predetermined distance (for instance, at a distance of 1 (m)) from the camera. That is, the reference brightness-difference obtaining process calculates brightness 2 of an object image obtained with LED 1j emitting light and brightness 1 of an object image obtained with LED 1j emitting no light, and further calculates the difference between the brightness 2 of the object image and the brightness 1 of the object image.

The exposure conditions for the reference brightness-difference obtaining process and those for the brightness-difference obtaining process may be substantially equivalent or may be different from each other. But in order to make simple obtaining processes to be executed by CPU 9 in the exposure-condition adjusting process, thereby reducing load of CPU 9, it is preferable to set equivalent the exposure conditions for both processes.

The flash memory 8 serves as a brightness-difference storing unit for storing the object brightness-difference calculated in the brightness-difference obtaining process.

Now, a photographing operation of the digital camera 100 will be described.

The digital camera 100 executes the reference brightness-difference obtaining process to calculate the reference brightness-difference information, and adjusts the exposure conditions using the calculated reference brightness-difference. First, the reference brightness-difference obtaining process will be described.

Now, the reference brightness-difference obtaining process will be described with reference to FIG. 3.

Figure 3:
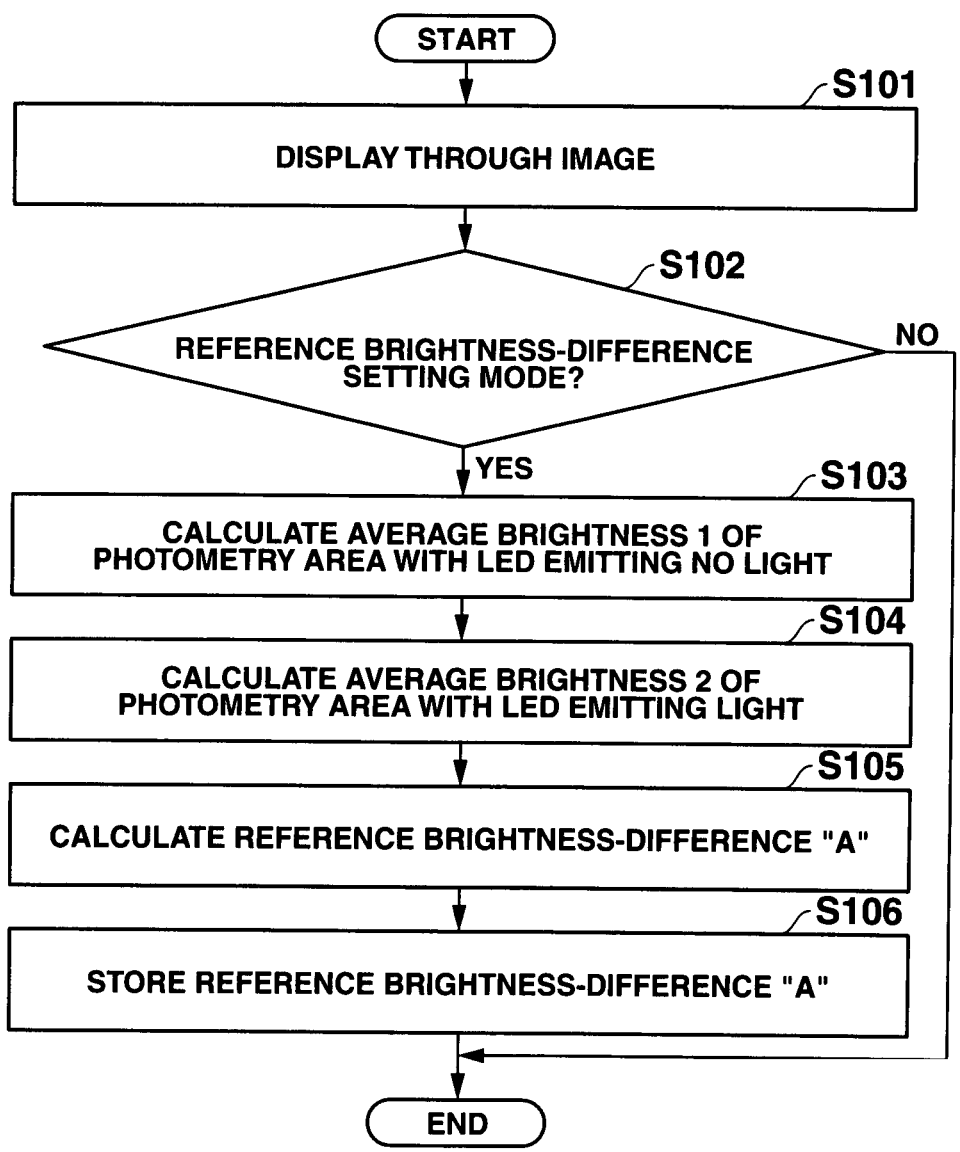
FIG. 3 is a flow chart of operation in a reference brightness-difference calculating process in the digital camera of FIG. 1.

FIG. 3 is a flow chart exemplifying operation for performing the reference brightness-difference obtaining process. Assuming that the digital camera 100 has been set to a reference brightness-difference setting mode at factory shipment, the reference brightness-difference obtaining process starts with photographing an object whose reflectance ratio is 18% and which locates at a distance of 1 (m) from the digital camera 100 with the object image appearing at the center of the display screen of the image display unit 2.

That is, when the power source unit 7 of the digital camera 100 is turned on at factory shipment, a through image is displayed on the display screen of the image display unit 2 under control of CPU 9 at step S101.

When the reference brightness-difference setting mode is set with the through image displayed on the display screen of the image display unit 2 (YES at step S102), CPU 9 controls operation of executing the reference brightness-difference obtaining process. More specifically, controlled by CPU 9, the imaging unit 1 photographs the object under predetermined exposure conditions with LED 1j emitting no light, thereby generating image data of the object image, and the image processing unit 1g calculates the average brightness 1 of photometry area in the object image based on the image data of the object image at step S103.

Further, controlled by CPU 9, the imaging unit 1 photographs the object under predetermined exposure conditions with LED 1j emitting light, thereby generating image data of the object image, and the image processing unit 1g calculates the average brightness 2 of photometry area in the object image based on the image data of the object image at step S104.

The position of the photometry area to be set on the display screen at steps S103 and S104 is set fixedly at the center portion of the display screen.

CPU 9 reads from the flash memory 8 and runs the brightness-difference obtaining program 8c at step S105, thereby calculating a difference between average brightness of the photometry area in the object image photographed with LED 1j emitting light and average brightness of the photometry area in the object image photographed with LED 1j emitting no light. Then, CPU 9 stores the calculated difference as the reference brightness-difference "A" in the predetermined storing area of the flash memory 8 at step S106. In this way, the reference brightness-difference obtaining process finishes.

Now, a photographing process in the digital camera 100 will be described with reference to FIG. 4.

Figure 4:
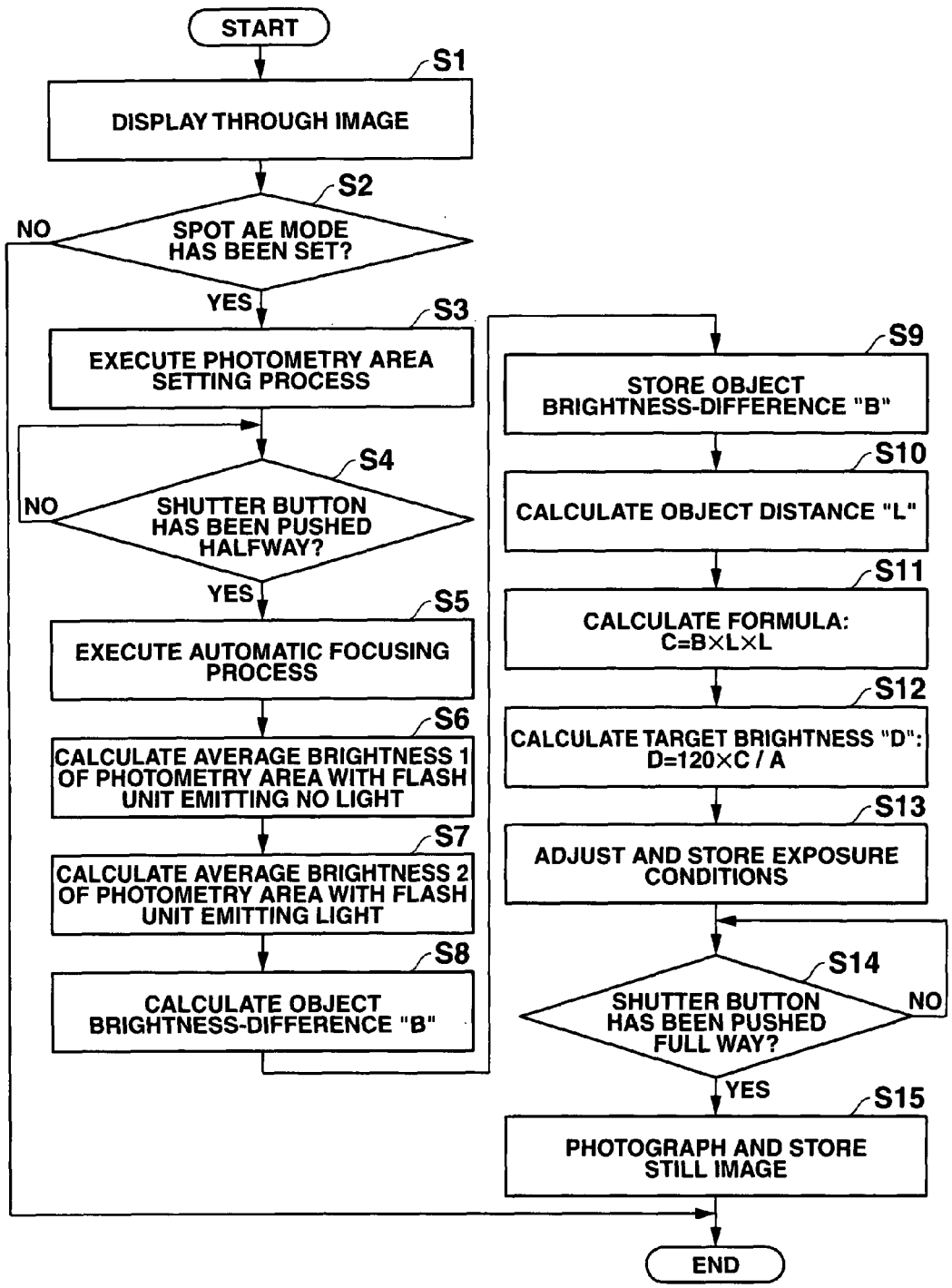
FIG. 4 is a flow chart of operation in a photographing process in the digital camera of FIG. 1.

FIG. 4 is a flow chart exemplifying operation of performing the photographing process.

When the power source unit 7 is turned on and a photographing mode is set in the digital camera 100, a through image is displayed on the display screen of the image display unit 2 under control of CPU 9 at step S1.

CPU 9 reads from the flash memory 8 and runs a judgment program at step S2 to judge whether or not a spot AE mode has been set.

When it is determined at step S2 that the spot AE mode has been set (YES at step S2), a photometry area setting process is executed under control of CPU 9 at step S3.

When an object is photographed to generate an object image, the photometry area setting process is executed for setting an photometry area in the object image. More specifically, the user operates the cross cursor button 51b of the operation unit 51 to move the photometry area frame to his or her desired position on the display screen of the image display unit 2, and then pushes the decision button to determine the position of the photometry area.

Thereafter, CPU 9 reads from the flash memory 8 and runs the judgment program at step S4 to judge whether the user has pushed the shutter button 51a halfway or not.

When it is determined at step S4 that the shutter button 51a has been pushed halfway (YES at step S4), CPU 9 reads from the flash memory 8 and runs the focusing-position adjustment program 8a at step S5 to execute an automatic focusing process using the determined photometry area as a focus area.

Then, CPU 9 controls execution of the automatic exposure process. More specifically, controlled by CPU 9, the imaging unit 1 photographs the object under the exposure conditions substantially similar to the exposure conditions under which the reference brightness-difference obtaining process has been executed with LED 1j emitting no light, thereby generating image data of the object image, and the image processing unit 1g calculates the average brightness 1 of photometry area in the object image based on the image data of the object image at step S6.

Further, controlled by CPU 9, the imaging unit 1 photographs the object under the exposure conditions substantially similar to the exposure conditions under which the reference brightness-difference obtaining process has been executed with LED 1*j* emitting light, thereby generating image data of the object image, and the image processing unit 1*g* calculates the average brightness 2 of photometry area in the object image based on the image data of the object image at step S7.

CPU 9 reads from the flash memory 8 and runs the brightness-difference obtaining program 8*c* at step S8 to calculate an object brightness-difference "B" from the average brightness 1 of photometry areas and the average brightness 2 of photometry areas in the object image, and stores the calculated object brightness-difference "B" on a predetermined storing area of SDRAM 3 at step S9.

Then, CPU 9 reads from the flash memory 8 and runs the object-distance obtaining program 8*b* to convert the position of the focus lens into the object distance "L" (m) in the automatic focusing process at step S10. That is, the position of the focus lens on the optical axis to which the focus lens has been adjusted is converted into the object distance "L" (m).

CPU 9 reads from the flash memory 8 and runs the exposure-condition adjusting program 8*d* to calculate the formula (1) using the object brightness-difference "B" stored on SDRAM 3 and the object distance "L" (m), thereby obtaining the solution "C" at step S11. Further, CPU 9 calculates the formula (2) using the solution "C" and the reference brightness-difference "A" stored on the flash memory 8, thereby obtaining the target brightness "D" for adjusting the exposure conditions at step S12.

Then, under control of CPU 9, the exposure conditions are adjusted based on the target brightness "D" and the average brightness 1 of the object image obtained with LED 1*j* emitting no light, and stored on the predetermined area of SDRAM 3 at step S13.

Thereafter, CPU 9 reads from the flash memory 8 and runs the judgment program at step S14 to judge whether the user has pushed the shutter button 51*a* full way or not.

When it is determined at step S14 that the shutter button 51*a* has been pushed full way (YES at step S14), CPU 9 reads the exposure conditions from SDRAM 3 to execute a process for photographing and recording a till image at step S15, in which the aperture (f stop value), shutter speed, the number of pixels to be added, gain are adjusted based on a predetermined program chart. Then, the photographing process terminates.

In the digital camera 100 according to the embodiment of the invention, the automatic exposure process is executed to adjust the exposure conditions for photographing the object based on the object brightness-difference "B" between the average brightness 2 of the object image generated with LED 1*j* emitting light and the average brightness 1 of the object image generated with LED 1*j* emitting no light.

In the automatic exposure process, the object brightness-difference "B" is converted based on the distance "L" of the object from the camera into a corresponding value "C", and the target brightness "D" is calculated based on the corresponding value "C" and the reference brightness-difference "A" to be used as the reference for adjusting the exposure conditions, and the final exposure conditions are determined based on the calculated target brightness "D". In this case, since the reference brightness-difference "A" and object brightness-difference "B" are calculated from brightness of an image portion falling within the photometry area of the object image in the spot AE mode, the exposure conditions can be correctly adjusted for the user's desired object. Further, the user is allowed to move the position of the photometry area by operating the cross cursor button, brightness of the specified object can be correctly calculated and therefore more attractive object images can be obtained using the present digital camera 100.

As described in the above detailed description, even in a photographing state in which all flashes of light produced by a flash unit cannot illuminate an object, and the reflectance ratio of the object cannot be correctly calculated, appropriate exposure conditions can be calculated using the reference brightness-difference "A", object difference-brightness "B", and the object distance "L".

Although specific embodiments of the present invention have been described, it should be understood that the present invention is by no means limited to the particular embodiments described herein, but various rearrangements, modifications, and substitutions may be made without departing from the scope of the invention.

For example, in the above described embodiments of the invention, the automatic exposure process is executed when the spot AE (AF) mode has been selected, but modification may be made to the above embodiment such that the automatic exposure process is executed, when AE mode other than the spot AE mode, such as a center priority photometry mode, whole area photometry mode, or multi-area photometry mode is selected. Further, in the above modes, the photometry area and focus area may be defined at the same area or at separate areas of the object image displayed on the image display unit 2. After the focus area is set in the displayed object image, such focus area may be set as the photometry area.

Hereinafter, an automatic exposure process will be described, which is executed when the multi-area photometry mode is set. When the shutter button 51*a* is pushed halfway in the multi-area photometry mode, the automatic focusing process starts and a focus area corresponding to the nearest object from the camera is automatically set under control of CPU 9, whereby the camera is focused on the object falling within the focus area. Thereafter, the, automatic exposure process is executed with the photometry area being set to the focus area.

CPU 9 functions as a focus area determining unit for determining the focus area automatically, wherein the object whose image falls within the focus area is focused on.

As described, the focus area is decided automatically, and the automatic exposure process is executed with the photometry area being set to the focus area. Therefore, the present invention provides the attractive digital camera 100 provided with user-friendly functions.

In the above embodiment, the automatic exposure process is executed after the automatic focusing process has been executed. Modification may be made to the embodiment such that the automatic focusing process is executed after the automatic exposure process has been executed. But when the automatic exposure process is executed in the multi-photometry area mode, the automatic exposure process can be executed only after the automatic focusing process has been executed, because the automatic exposure process is executed with the photometry area being set to the focus area after the photometry area has been set to the focus area.

In the embodiment described above, the user is allowed to set the photometry area (focus area) to any position on the display screen of the image display unit 2, but modification may be made such that such photometry area (focus area) is fixedly set to the center portion of the display screen of the image display unit 2.

The photometry area (focus area) may be set to any size as far as the photometry area (focus area) falls within the display screen.

In addition, for example, a face portion of a person that is recognized by a facial recognition technique may be used as the photometry area (focus area).

In the above described embodiment, the photometry (AE) area and/or focus (AF) area are set as a portion of the object image to be used for calculating brightness and brightness difference of the object image, but any area other than the photometry (AE) area and/or focus (AF) area may be set as an area for calculating brightness and brightness difference of the object image.

In the embodiment described above, only exposure conditions under which a still image is to be photographed are changed in accordance with the exposure conditions adjusted in the automatic exposure process. But modification may be made that exposure conditions are changed in accordance with the exposure conditions adjusted in the automatic exposure process with respect to a through image displayed during a period between the time when the shutter button 51a has been pushed halfway and the time when the shutter button 51a is pushed full way thereafter.

Since limitation of the shutter speed for the object image to be photographed is different form the limitation of the shutter speed for the through image, it is preferable to change photographing conditions in accordance with conditions (for example, amplifier gain) other than the shutter speed. That is, it is preferable to use separate program charts for adjusting exposure conditions for the object image to be photographed and those for the through image respectively.

Further, in the embodiment described above, the automatic exposure process of the invention is executed for the photographing process to be executed with the flash unit producing no light, but the automatic exposure process may be executed for the photographing process to be executed with the flash unit producing light.

That is, when the photographing process is executed with the flash unit producing light, CPU 9 adjusts the exposure conditions based on the target brightness "D" and the average brightness 2 of the object image obtained with LED 1j emitting light at step S13 in FIG. 4, and further adjusts light volume of the flash unit in accordance with a predetermined program chart at step S15.

Furthermore, in the embodiment described above, the automatic exposure process of the invention is used in taking still images, but may be used in producing moving images.

In addition, in the embodiment of the invention, CPU 9 runs the predetermined programs to perform functions as a focusing-position adjusting unit, object-distance obtaining unit, brightness-difference obtaining unit, exposure-condition adjusting unit, exposure-conditions determining unit, and exposure-control executing unit, but these units may be set up with logic circuits for executing their functions.

What is claimed is:

1. An imaging apparatus comprising:
   a flash unit for emitting light toward an object;
   an imaging unit for photographing the object to obtain an object image of the object, wherein the imaging unit obtains a first object image of the object with the flash unit emitting light, and obtains a second object image of the object with the flash unit emitting no light;
   a brightness obtaining unit for obtaining a brightness of the first object image and a brightness of the second object image;
   a brightness-difference obtaining unit for obtaining a brightness difference of the object between the brightness of the first object image and the brightness of the second object image obtained by the brightness obtaining unit;
   an object-distance obtaining unit for obtaining an object distance between the imaging unit and the object;
   a reference brightness-difference storing unit for storing a reference brightness-difference;
   a target brightness obtaining unit for obtaining a target brightness based on a value that is obtained from a formula that includes the brightness difference, the reference brightness, and the object distance; and
   an exposure-condition adjusting unit for adjusting exposure conditions for adjusting brightness of an image and under which the imaging unit photographs the object, based on the target brightness;
   wherein the target brightness obtaining unit obtains said value from the formula $C = B \times L^2$ where C is said value, B is the brightness difference, and L is the object distance, and
   wherein the target brightness obtaining unit obtains the target brightness from the formula $D = E \times C/A$ where D is the target brightness, E is a predetermined number, C is said value, and A is the reference brightness-difference.

2. The imaging apparatus according to claim 1, wherein the reference brightness-difference stored by the reference brightness-difference storing unit is obtained in the same manner as the brightness difference of the object is obtained by the brightness-difference obtaining unit.

3. The imaging apparatus according to claim 1, further comprising:
   a portion designating unit for designating a portion of the object image,
   wherein the brightness obtaining unit obtains the brightness of the first object image using a designated portion of the first object image, and the brightness obtaining unit obtains the brightness of the second object image using a designated portion of the second object image.

4. The imaging apparatus according to claim 3, wherein the brightness obtaining unit obtains a brightness of the designated portion of the first object image and obtains a brightness of the designated portion of the second object image, and
   wherein the brightness-difference obtaining unit obtains the brightness difference of the object based on the brightness of the designated portion of the first object image and the brightness of the designated portion of the second object image obtained by the brightness obtaining unit.

5. The imaging apparatus according to claim 3, further comprising:
   a focusing position adjusting unit for adjusting a focusing position of the imaging unit,
   wherein the portion of the object image designated by the portion designating unit is set as a focus area to be used by the focusing position adjusting unit to adjust the focusing position.

6. The imaging apparatus according to claim 3, wherein the portion of the object image designated by the portion designating unit is set as a photometry area to be used by the exposure-condition adjusting unit to adjust the exposure conditions.

7. The imaging apparatus according to claim 1, wherein the exposure-condition adjusting unit comprises:
   an exposure-condition determining unit for determining the exposure conditions; and
   an exposure-control executing unit for controlling exposure of the imaging unit based on the exposure conditions determined by the exposure-condition determining unit.

8. The imaging apparatus according to claim 7, further comprising:
a shutter button adapted to be halfway or fully depressed by a user,
wherein the exposure-condition determining unit of the exposure-condition adjusting unit determines the exposure conditions in response to a halfway depressed operation of the shutter button, and the exposure-control executing unit of the exposure-condition adjusting unit controls exposure of the imaging unit in response to a fully depressed operation of the shutter button.

9. The imaging apparatus according to claim 1, wherein the flash unit comprises an LED, and
wherein the imaging apparatus further comprises a second flash unit for emitting light toward the object when the imaging unit photographs the object under the exposure conditions adjusted by the exposure-condition adjusting unit.

10. The imaging apparatus according to claim 1, wherein the brightness obtaining unit obtains the brightness of the first object image by obtaining an average brightness of a first region in the first object image, and
wherein the brightness obtaining unit obtains the brightness of the second object image by obtaining an average brightness of a second region in the second object image that has a same position and a same size as the first region in the first object image.

11. The imaging apparatus according to claim 1, wherein E is 120.

12. An exposure controlling method for an imaging apparatus including a flash unit for emitting light toward an object, an imaging unit for photographing the object to obtain an object image of the object, a brightness obtaining unit for obtaining a brightness of the object image, an object-distance obtaining unit for obtaining an object distance between the imaging unit and the object, and a reference brightness-difference storing unit for storing a reference brightness-difference, the method comprising:
photographing the object with the flash unit emitting light, thereby obtaining a first object image of the object;
photographing the object with the flash unit emitting no light, thereby obtaining a second object image of the object;
obtaining a brightness of the first object image and a brightness of the second object image with the brightness obtaining unit;
obtaining a brightness difference of the object between the brightness of the first object image and the brightness of the second object image;
obtaining the object distance between the imaging unit and the object with the object-distance obtaining unit;
obtaining a target brightness based on a value that is obtained from a formula that includes the brightness difference, the reference brightness, and the object distance; and
adjusting exposure conditions for adjusting brightness of an image and under which the imaging unit photographs the object, based on the target brightness;
wherein said value is obtained from the formula $$C = B \times L^2$$

where C is said value, B is the brightness difference, and L is the object distance, and
wherein the target brightness is obtained from the formula $$D = E \times C/A$$

where D is the target brightness, E is a predetermined number, C is said value, and A is the reference brightness-difference.

13. The method according to claim 12, wherein E is 120.

14. A non-transitory computer readable medium having a program stored thereon that is executable by a computer of an imaging apparatus that includes a flash unit for emitting light toward an object, an imaging unit for photographing the object to obtain an object image of the object, a brightness obtaining unit for obtaining a brightness of the object image, an object-distance obtaining unit for obtaining an object distance between the imaging unit and the object, and a reference brightness-difference storing unit for storing a reference brightness-difference, wherein the program is executable by the computer to control the imaging apparatus to perform functions comprising:
photographing the object with the flash unit emitting light, thereby obtaining a first object image of the object;
photographing the object with the flash unit emitting no light, thereby obtaining a second object image of the object;
obtaining a brightness of the first object image and a brightness of the second object image with the brightness obtaining unit;
obtaining a brightness difference of the object between the brightness of the first object image and the brightness of the second object image;
obtaining the object distance between the imaging unit and the object with the object-distance obtaining unit;
obtaining a target brightness based on a value that is obtained from a formula that includes the brightness difference, the reference brightness, and the object distance; and
adjusting exposure conditions for adjusting brightness of an image and under which the imaging unit photographs the object, based on the target brightness;
wherein said value is obtained from the formula $$C = B \times L^2$$

where C is said value, B is the brightness difference, and L is the object distance, and
wherein the target brightness is obtained from the formula $$D = E \times C/A$$

where D is the target brightness, E is a predetermined number, C is said value, and A is the reference brightness-difference.

15. The non-transitory computer readable medium according to claim 14, wherein E is 120.

* * * * *